United States Patent [19]
Peppmöller

[11] 4,415,472
[45] Nov. 15, 1983

[54] MIXTURE OF ALKALI SALTS OF SULFO-SUCCINIC ACID DIALKYLESTERS AND HIGHER ALIPHATIC ALCOHOLS, USE THEREOF TO DEFOAM MINERAL ACID DECOMPOSITION MEDIA

[75] Inventor: Reinmar Peppmöller, Krefeld, Fed. Rep. of Germany

[73] Assignee: Chemische Fabrik Stockhausen GmbH, Fed. Rep. of Germany

[21] Appl. No.: 263,441

[22] Filed: May 14, 1981

[30] Foreign Application Priority Data

May 16, 1980 [DE] Fed. Rep. of Germany ....... 3018758

[51] Int. Cl.$^3$ .............................................. B01D 17/00
[52] U.S. Cl. ..................................... 252/321; 252/358
[58] Field of Search ................. 252/321, 358; 423/319

[56] References Cited

U.S. PATENT DOCUMENTS 3,598,755  8/1971  McBroom ........................... 252/321
3,798,183  3/1974  Bruson .............................. 252/557

FOREIGN PATENT DOCUMENTS 830875  4/1958  United Kingdom .
1214593  3/1969  United Kingdom .

OTHER PUBLICATIONS

Caryl, "Sulfosuccinic Esters", *Industrial and Engineering Chemistry*, 33: 731–737.
Kirk–Othmer Encyclopedia of Chemical Technology, 2nd completely revised ed., vol. 14, pp. 373–375, (1967).

*Primary Examiner*—Josephine Barr
*Attorney, Agent, or Firm*—Jones, Tullar & Cooper

[57] ABSTRACT

The invention concerns mixtures of alkali salts of sulfo-succinic acid dialkylesters and higher aliphatic alcohols, and the use of these mixtures as defoaming agents for mineral acid decomposition media, in particular media decomposing phosphates.

20 Claims, No Drawings

MIXTURE OF ALKALI SALTS OF SULFO-SUCCINIC ACID DIALKYLESTERS AND HIGHER ALIPHATIC ALCOHOLS, USE THEREOF TO DEFOAM MINERAL ACID DECOMPOSITION MEDIA

The invention relates to mixtures of alkali salts of sulfosuccinic acid dialkylesters and higher aliphatic alcohols and their use as defoaming agents for mineral acid decomposition media, particularly phosphate decomposition media.

The foaming behavior of strongly acid media represents a substantial drawback in technical processing. It requires a corresponding allowance in the equipment design of production facilities and lowers output to an undesirable degree. There is present also the danger of an uncontrollable increase in foam and hence the risk of foam boiling over with all the attendant problems such as metal corrosion and skin etching.

There exists a pressing necessity to facilitate inherently foaming industrial processes employing acids and to being them under control by using defoaming agents. Almost all available organic, hydrophobic liquids, often even without further additives, have been used to that end. In particular these are: tall oil, tall oil fatty acids, oleic acid, sulfated tall oil fatty acids, sulfated oileic acid and silicones. Other known foaming inhibitors are based on the alkoxylates of fatty acids and fatty alcohols.

Experience shows that the effectiveness of a defoaming agent largely depends on the substrate composition. In addition, the temperature, the air supply location or the kind and amount of any gas generated in the reaction medium also play determinant roles. Previously, most of the time, defoaming would succeed only for a brief time, so that frequently it was necessary to apply doses sequentially or at several empirically determined intervals. Still it was questionable whether the additive actually had been optimally distributed.

It was moreover found that for ever higher doses of defoaming agents, the container material and/or the sealing means were significantly corroded. The latter finding applied especially to rubber seals upon contact with media containing fatty acids. As in a very short time fatty acids are released from fatty-acid-ester mineral acids, the corresponding observations also held for defoaming agents containing fats. In many ways the products used to attenuate foaming were more effective in neutral or weakly alkaline media than in the acid ones. As regards wet process production of phosphoric acid, specifically, U.S. Pat. No. 3,437,437 describes the use of a fatty acid reaction product with 0.25 to 1 mole of hydroxylamine. This product consists of amides, amide esters and non-reacted fatty acid. However a desirable product would be free of fatty acid or fatty acid derivatives.

It is therefore the object of the invention to create a defoaming agent, free of fatty acid or fatty acid derivatives, for strongly mineral acid systems, evidencing as uniform and favorable a foaming behavior as possible under various operating conditions and compositions of the foaming system.

This problem is solved by the invention by a mixture of alkali salts of sulfosuccinic acid dialkylesters and higher aliphatic alcohols.

Therefore an object of the invention is a mixture characterized by a mixture comprising:

(a) at least one alkali salt of at least one sulfosuccinic acid dialkylester (b) at least one higher aliphatic alcohol, the weight ratio of components (a) to (b) being $\frac{1}{4}$ to 40/1, preferably $\frac{1}{3}$ to 30/1, and (c) optionally at least one monovalent lower alcohol, one polyvalent lower alcohol, one ether alcohol and/or one either water-soluble polyalkyleneglycol, possibly with water, or an oil-soluble polyalkylene glycol, possibly with aliphatic, alicyclic and/or aromatic hydrocarbons in amounts up to 60% by weight based on the total mixture of the components (a), (b) and (c).

The good defoaming effect is surprising in that the components (a) and (b) of the mixture when used alone only evidence a very slight defoaming effect under the same operating conditions.

Those defoaming mixtures are especially suited wherein the weight ratio of componennts (a) to (b) is $\frac{1}{4}$ to 4/1, preferably $\frac{1}{3}$ to 3/1. The weight ratio of the two components (a) and (b) is critical for the defoaming effect. Outside the mixing ratios indicated, the defoaming effect drops significantly, whereas within this range a clearly synergistic effect is evident, i.e., well above the defoaming effectiveness of the individual components.

The alkyl residues of the component (a) may be the same or different, linear and/or branched, and comprise at least 7 and at most 22 carbon atoms. Component (a) also may consist of 2 or more different sulfosuccinic acid dialkylesters, a mixture of different alkali salts possibly being used, if desired. The sodium salts are especially preferred alkali metal salts. However, the salts of potassium and ammonium may also be used.

Examples of suitable dialkylesters of sulfosuccinic acid are: heptylester, octylester, nonylester, decylester, undecylester, dodecylester, tridecylester, myristylester, pentadecylester, cetylester, stearylester, heptadecylester, oleylester, nonadecylester, arachylester, heneicosylester and behenylester with linear or branched carbon chains.

The admixed component (b), i.e., the higher aliphatic alcohol, can be linear or branched, and contain at least 6 and at most 20 carbon atoms, preferably 7 to 13 C atoms. It was found that linear alcohols provide a somewhat better defoaming effect than branched alcohols with the same carbon number. Component (b) also may comprise several different alcohols.

Examples of higher alcohols are:

Hexanol, heptanol, octanol, nonanol, decanol, undecanol, dodecanol, tridecanol, myristin alcohol, pentadecanol, cetyl alcohol, heptadecanol, stearyl alcohol, oleyl alcohol, nonadecanol and arachyl alcohol with linear or branched carbon chains.

As the rule the mixtures are liquids of low to average viscosities which upon addition of water can be dissolved or emulsified, with intermediate formation of a highly viscous gel.

In order to improve the handling, especially the dissolution and emulsification behaviour, of the mixture of components (a) and (b) with respect to their application as a defoaming agent, appropriate additional additives comprising monovalent and/or polyvalent lower alcohols, ether alcohols and/or water-soluble polyalkylene glycols are admixed with mixture of the components (a) and (b). These additives can either already be aqueous on account of their preparation or be added jointly with water. In lieu of water-soluble polyalkylene glycols, it is also possible to add oil-soluble polyalkylene glycols, polyalkylene glycol ethers and/or higher dialkylethers, optionally together with paraffinic and/or cyclic hydrocarbons, such as mineral oils for instance.

Examples of suitable lower alcohols, ether alcohols and water-soluble polyalkylene glycols are methanol, ethanol, propanol, butanol, isobutanol, pentanol, isopentanol, isopropanol, ethylene glycol, diethylene glycol, triethylene glycol, propylene glycol, polypropylene glycol (molecular weight <800), polyethylene glycol (molecular weight 200-2000), 3-methoxybutanol, methyl glycol ethyl glycol, propyl glycol, methyl diglycol, ethyl diglycol, butyl diglycol, and glycerine.

Illustrative oil-soluble ether alcohols, polyglycols and dialkylethers are: butyl glycol, butyldiglycol, polypropylene glycol (molecular weight 800-2000), diheptylether, dioctylether, dinonylether, didecylether, and diundecylether.

The proportion of this component (c) is preferably between 1 and 60, most preferably 5 to 30% by weight based on the total mixture of (a)+(b)+(c).

By adding component (c), the mixture can be formed into a homogeneous liquid or emulsion by means of water without a gel forming first.

The sulfosuccinic acid esters useful for the preparation of the defoaming agent can be produced by known methods using maleic acid diesters by sulfation with for instance sodium hydrogen sulfite (French patent 1,089,797, and Caryl, IND. ENG. CHEM. 33 [6]. 1941).

The higher linear and/or branched alcohols are obtained by current large-scale processes from native fatty acids by means of catalytic hydrogenation from ethylene by the Ziegler process or also from higher olefins by the Oxo synthesis. The alcohols may be used in pure form, though also in industrial grade, as long as the alcoholic components are character-determinant.

The mixtures of the invention are applicable wherever a foam is generated in a mineral acid medium and must be suppressed or reduced. This is especially the case in wet decomposition processes, for instance in the production of phosphoric acid by reacting phosphate rocks with sulfuric acid. When making phosphoric acid by the "wet process", phosphate rocks (for instance apatite) are allowed to react with sulfuric acid of precisely determined concentration at elevated temperature. As a rule this takes place in a mixer and several cascaded decomposition vessels.

Excessive foaming takes place in the phosphoric acid wet-process for most of the commonplace, calcined and uncalcined phosphate minerals, and it is especially pronounced in the mixing and the first decomposition vessels, though it also may substantially interfere in the subsequent decomposition vessels or the evaporator.

Another application of the defoaming of the invention relates to the NPK process wherein phosphate rock is made to react with nitric acid of a given concentration and is thus converted into a fertilizer. In this case too there is substantial foaming in the decomposition phase, requiring the use of a defoaming agent.

The use concentration of the defoaming agent of the invention depends on the process in question, for example in phosphate decomposition it depends, in part, on the grade of the phosphate rocks employed. As the foaming varies with the country of origin, the amount of defoamer to be used is determined by a preliminary test in the lab. As a rule proportions of 45 to 600 g/ton of $P_2O_5$ suffice to curb foaming, however concentrations in excess of such figures are possible without reservation. In any even a small foam suppressing effective amount is employed depending on the exact process in question.

The invention is now discussed in further detail in relation to the examples below:

EXAMPLES

Typical representative components were selected from the groups of sulfosuccinic acid esters, higher alcohols and glycols, and mutually mixed 10 times so that the weight ratio of the ester to the higher alcohol would be between ¼ and 40/1, preferably ⅓ and 30/1. Ten defoaming agents were obtained (I through X), the composition of which is listed in the table below.

TABLE 1

|  | I | II | III | IV | V | VI | VII | VIII | IX | X | XI | XII |
|---|---|---|---|---|---|---|---|---|---|---|---|---|
| sulfosuccinic acid di-2-ethylhexylester, —Na | 65% | 65% |  |  |  | 30% |  | 30% |  |  |  | 85% |
| sulfosuccinic acid -di-isononyl-ester, Na salt |  |  | 50% |  |  |  | 40% | 30% |  |  |  |  |
| sulfosuccinic acid di-isododecyl ester, Na salt |  |  |  | 30% |  |  |  |  |  |  |  |  |
| sulfosuccinic acid di-n-octyl ester, Na salt |  |  |  |  | 25% |  |  |  |  |  |  |  |
| sulfosuccinic acid di-behenylester, Na salt |  |  |  |  |  |  |  |  | 30% |  |  |  |
| sulfosuccinic acid di-isononylester, Na salt |  |  |  |  |  |  |  |  |  | 80% |  |  |
| h-octyl alcohol | 30% |  |  |  |  |  | 15% |  |  |  |  |  |
| n-nonyl alcohol |  |  |  | 40% |  |  |  |  |  |  | 100% |  |
| n-undecyl alcohol |  | 30% |  |  |  |  | 15% |  |  |  |  |  |
| alcohol mixture from the Oxo synthesis, OH number: 225 |  |  |  |  | 60% | 60% |  |  |  | 2% |  |  |
| alcohol mixture from the Oxo synthesis, OH number: 140 |  |  |  |  |  | 70% |  | 50% |  | 70% |  |  |
| ethylene glycol | 5% | 5% |  |  |  | 10% |  | 10% |  |  |  |  |
| 1,2-propane diol |  |  | 10% |  |  |  | 10% |  |  |  |  | 15% |
| diethylene glycol mono-butylether |  |  |  | 10% | 5% |  |  |  | 18% |  |  |  |

Defoaming agent IX is n-nonyl alcohol alone, and defoaming agent X is a mixture of sulfosuccinic acid diester and propanediol.

The preparation procedure of the mixture of the invention is not critical per se and can be implemented by known methods. It is not essential as regards its application as defoaming agent whether the mixture of the components (a) and (b) and possibly (c) is added as such to the medium to be defoamed or whether the individual mixture components are separately added.

To determine the foaming intensity of phosphate rocks when being decomposed by sulfuric acid, 100 g of Khourigba phosphate (grain size <0.5 mm) each time were poured into 142 g of (64%) sulfuric acid and stirred by means of a blade agitator (70 rpm). A one-liter polyethylene flask with a diameter of 90 mm and a cut-off upper part was used as the decomposition vessel. Foaming heights were measured with time and compared percentagewise with the values obtained in the absence of a defoamer (tables 2, 3, and 4). The test duration was 1½ hours. Thereupon the decomposed substance was passed through a glass vacuum filter (D1) and the filtrate was passed again through a glass filter pan (D4). Lastly the iodine color scale (JFZ) of the resulting crude phosphoric acid was determined (DIN 6162).

The computation of the percentage residual foaming height (R) with respect to the no-defoamer value is given by $$R = 100 S_{ni}/S_{oi}$$

where $S_{ni}$ = the foaming height at time i, $S_{oi}$ the foaming height of the substance without a defoaming agent at time i.

To implement the defoaming tests in the manner of the NPK process, 100 g of 57% nitric acid were placed in each case in a one-liter polyethylene flask (90 mm $\phi$, cut off) and 50 g of crude phosphate with a grain size less than 0.5 mm were poured in within 10 minutes at 20° to 25° C. A blade agitator rotating at 70 rpm was used to stir, the test duration being 1½ hours. The input quantities of the defoaming agent were 300 g and 600 g per ton of crude phosphate, corresponding to 95 and 190 g per ton of $P_2O_5$ respectively. The foaming heights were measured at given time intervals and compared percentagewise with the values for no defoaming agent (tables 5, 6 and 7). The lowest percentage residual foam height during the first 15 minutes of decomposition was used as the criterion for the defoaming effectiveness of a product. The effectiveness of the tested products are shown in the tabular survey below.

TABLE 2

No-defoaming agent test, defoamer concentration: 0 g per ton of crude phosphate.

| Time (min): | 0 | 15 | 30 | 60 | 90 |
|---|---|---|---|---|---|
| foaming height (mm): | 47 | 24 | 17 | 14 | 9 |

TABLE 3

Defoamer concentration: 150 g per ton of crude phosphate

| Defoamer | | 0 | 15 | 30 | 60 | 90 |
|---|---|---|---|---|---|---|
| I | % | 21,3 | 20,8 | 17,6 | 14,3 | <14 |
| II | % | 20,2 | 18,8 | 14,7 | 14,3 | <14 |
| III | % | 22,4 | 20,8 | 17,6 | 14,3 | <14 |
| IV | % | 22,4 | 20,8 | 17,6 | 14,3 | <14 |
| V | % | 23,4 | 22,9 | 17,6 | 14,3 | <14 |
| VI | % | 21,3 | 20,8 | 17,6 | 14,3 | <14 |
| VII | % | 21,3 | 20,8 | 17,6 | 14,3 | <14 |
| VIII | % | 22,4 | 20,8 | 17,6 | 14,3 | <14 |
| IX | % | 24,5 | 23,3 | 18,2 | 15,0 | 14,3 |
| X | % | 38,4 | 25,0 | 21,2 | 16,4 | 14,5 |
| XI | % | 42,5 | 27,1 | 23,5 | 17,8 | 15,0 |

TABLE 3-continued

Defoamer concentration: 150 g per ton of crude phosphate

| Defoamer | | 0 | 15 | 30 | 60 | 90 |
|---|---|---|---|---|---|---|
| XII | % | 44,7 | 29,2 | 23,5 | 14,3 | <14 |

TABLE 4

| Defoamer | | 0 | 15 | 30 | 60 | 90 | JFZ |
|---|---|---|---|---|---|---|---|
| I | % | 20,2 | 18,8 | 17,6 | 14,3 | <14 | <10 |
| II | % | 20,2 | 18,8 | 17,6 | 14,3 | <14 | <10 |
| III | % | 22,4 | 20,8 | 17,6 | 14,3 | <14 | <10 |
| IV | % | 21,3 | 20,8 | 17,6 | 14,3 | <14 | <10 |
| V | % | 21,3 | 20,8 | 17,6 | 14,3 | <14 | <10 |
| VI | % | 22,4 | 20,8 | 17,6 | 14,3 | <14 | <10 |
| VII | % | 20,2 | 18,8 | 17,6 | 14,3 | <14 | <10 |
| VIII | % | 21,3 | 20,8 | 17,6 | 14,3 | 14 | 10 |
| IX | % | 23,4 | 22,4 | 17,6 | 14,3 | <14 | |
| X | % | 37,3 | 24,2 | 20,6 | 14,3 | <14 | |
| XI | % | 41,5 | 25,0 | 20,6 | 14,3 | <14 | <10 |
| XII | % | 42,5 | 27,1 | 23,5 | 14,3 | <14 | <10 |

TABLE 5

No defoaming agent test, defoamer concentration: 0 g per ton of crude phosphate

| Defoaming Agent (sic) time (min) | 0 | 15 | 30 | 60 | 90 |
|---|---|---|---|---|---|
| foam height (mm) | 83 | 54 | 44 | 29 | 20 |

TABLE 6

Defoamer concentration: 300 g per ton of crude phosphate

| Defoamer | | 0 | 15 | 30 | 60 | 90 |
|---|---|---|---|---|---|---|
| I | % | 32,5 | 30,5 | 26,1 | 22,4 | 15,0 |
| II | % | 31,3 | 28,6 | 24,9 | 17,2 | <15 |
| III | % | 30,1 | 27,8 | 22,7 | 17,2 | <15 |
| IV | % | 33,8 | 29,6 | 25,0 | 20,7 | <15 |
| V | % | 34,9 | 31,5 | 22,7 | 15,0 | <15 |
| VI | % | 33,8 | 30,5 | 25,0 | 20,7 | 15,0 |
| VII | % | 32,5 | 28,6 | 22,7 | 17,2 | <15 |
| VIII | % | 32,5 | 28,6 | 22,7 | 27,2 | <15 |
| IX | % | 41,5 | 40,7 | 39,8 | 38,0 | 37,5 |
| X | % | 47,0 | 46,2 | 43,2 | 41,4 | 40,0 |
| XI | % | 72,3 | 53,7 | 43,2 | 41,4 | 35,0 |
| XII | % | 49,4 | 53,7 | 50,0 | 48,3 | 40,0 |

TABLE 7

Defoamer concentration: 600 g per ton of crude phosphate

| Defoamer | | 0 | 15 | 30 | 60 | 90 |
|---|---|---|---|---|---|---|
| I | % | 28,9 | 29,6 | 25,0 | 17,2 | <15 |
| II | % | 28,3 | 26,9 | 20,5 | 15,5 | <15 |
| III | % | 27,7 | 24,1 | 15,9 | 15 | <15 |
| IV | % | 30,1 | 28,7 | 19,3 | 15,5 | <15 |
| V | % | 28,3 | 26,0 | 15,9 | 17,2 | <15 |
| VI | % | 30,1 | 29,6 | 19,3 | 17,2 | <15 |
| VII | % | 28,3 | 26,9 | 18,2 | 15,5 | <15 |
| VIII | % | 28,3 | 26,9 | 18,2 | 15,5 | <15 |
| IX | % | 38,5 | 38,9 | 34,1 | 29,3 | 20,0 |
| X | % | 37,4 | 40,7 | 36,4 | 32,8 | 25,0 |
| XI | % | 63,9 | 44,4 | 34,1 | 31,0 | 25,0 |
| XII | % | 39,8 | 46,3 | 40,9 | 34,5 | 25,0 |

I claim:
1. A defoamer which is a mixture comprising
   (a) at least one alkali salt of at least one sulfosuccinic acid dialkylester wherein the alkyl groups are the same or different and are linear or branched alkyl groups containing 7 to 20 carbon atoms, and

(b) at least one higher unbranched or branched aliphatic alcohol containing 6 to 20 carbon atoms, the weight ratio of component (a) to component (b) being ¼ to 40/1.

2. The mixture of claim 1, which additionally contains
(c) at least one selected from the group consisting of monovalent lower alcohols, polyvalent lower alcohols, ether alcohols alone or in admixture with water or a water or oil soluble polyalkylene glycol in turn alone or in admixture with alicyclic or aromatic hydrocarbons, (c) being present in amounts up to 60% by weight based on the total weight of (a), (b) and (c).

3. The mixture as in claims 1 or 2, wherein the mixture ratio of the component (a) to the component (b) is ¼ to 4/1.

4. The mixture as in claim 3, wherein the mixture ratio of component (a) to component (b) is ⅓ to 3/1.

5. The mixture as in claim 3, wherein the higher aliphatic alcohol (b) comprises 7 to 13 carbon atoms.

6. The mixture as in claims 1 or 2, which contains at least 2 different sulfosuccinic acid dialkylesters (a).

7. The mixture as in claims 1 or 2, which contains at least two different higher aliphatic alcohols (b).

8. The mixture as in claim 3, wherein the proportion of the component (c) is 5 to 30% by weight.

9. The mixture as in claims 1 or 2, containing a higher aliphatic alcohol (b) prepared by the method of the Oxo synthesis.

10. The mixture as in claims 1 or 2 wherein the ratio of component (a) to component (b) is ⅓ to 30/1.

11. In a method of defoaming a mineral acid decomposition medium the improvement comprising employing a defoamer which is a mixture comprising
(a) at least one alkali salt of at least one sulfosuccinic acid dialkylester wherein the alkyl groups are the same or different and are linear or branched alkyl groups containing 7 to 20 carbon atoms, and
(b) at least one higher unbranched or branched aliphatic alcohol containing 6 to 20 carbon atoms, the weight ratio of component (a) to component (b) being ¼ to 40/1.

12. The method of claim 11 wherein the mixture additionally contains (c):
(c) at least one selected from the group consisting of monovalent lower alcohols, polyvalent lower alcohols, ether alcohols alone or in admixture with water or a water or oil soluble polyalkylene glycol in turn alone or in admixture with alicyclic or aromatic hydrocarbons, (c) being present in amounts up to 60% by weight based on the total weight of (a), (b) and (c).

13. The method of claims 11 or 12 wherein the mixture ratio of the component (a) to the component (b) is ¼ to 4/1.

14. The method of claim 13 wherein the mixture ratio of component (a) to component (b) is ⅓ to 3/1.

15. The method of claim 13 wherein the higher aliphatic alcohol (b) comprises 7 to 13 carbon atoms.

16. The method of claims 11 or 12 wherein the mixture contains at least two different higher aliphatic alcohols (b).

17. The method of claims 11 or 12 wherein the mixture contains at least two different sulfosuccinic acid dialkylesters (a).

18. The method of claim 13 wherein the proportion of the component (c) is 5 to 30% by weight.

19. The method of claims 11 or 12 wherein phosphates are being decomposed.

20. The method of claim 19 where the defoamer is employed in an amount of 45 to 600 g. per ton of $P_2O_5$.

* * * * *